United States Patent
Pooser et al.

(10) Patent No.: US 10,635,403 B1
(45) Date of Patent: Apr. 28, 2020

(54) QUANTUM RANDOM NUMBER GENERATOR

(71) Applicant: UT-Battelle, LLC, Oak Ridge, TN (US)

(72) Inventors: Raphael C. Pooser, Knoxville, TN (US); Benjamin J. Lawrie, Oak Ridge, TN (US); Bing Qi, Knoxville, TN (US); Brian P. Williams, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 16/142,984

(22) Filed: Sep. 26, 2018

Related U.S. Application Data

(60) Provisional application No. 62/563,682, filed on Sep. 27, 2017.

(51) Int. Cl.
  *G06F 7/58* (2006.01)
  *G01J 1/04* (2006.01)

(52) U.S. Cl.
  CPC ............ *G06F 7/588* (2013.01); *G01J 1/0425* (2013.01); *G06F 7/58* (2013.01)

(58) Field of Classification Search
  CPC ...... G06F 7/588; G06F 7/58; G01J 1/0425;qa G01J 1/0459; G01J 1/1626; G01J 1/20
  See application file for complete search history.

(56) References Cited

U.S. PATENT DOCUMENTS

| 7,284,024 B1* | 10/2007 | Trifonov ............... B82Y 10/00 708/3 |
| 2016/0328211 A1* | 11/2016 | Nordholt ............... H04L 9/0852 |
| 2018/0260192 A1 | 9/2018 | Choi et al. |

FOREIGN PATENT DOCUMENTS

WO   2017/116055   7/2017

OTHER PUBLICATIONS

Lougovski, P. et al., "An Observed-Data-Consistent Approach to the Assignment of Bit Values in a Quantum Random Number Generator", downloaded at arXiv:1404.5977v1 [quant-ph], submitted Apr. 23, 2014, pp. 1-10.

* cited by examiner

*Primary Examiner* — David P Porta
*Assistant Examiner* — Fani Boosalis
(74) *Attorney, Agent, or Firm* — Warner Norcross + Judd LLP

(57) ABSTRACT

A system and method are provided to yield a QRNG based on homodyne detection of quantum noise (e.g., vacuum noise measured as shot noise) generated from a local oscillator, such as an LED. In one embodiment, a QRNG may be provided that is adjustable based on a control input to produce a random output that can be translated to one or more random data bits.

23 Claims, 4 Drawing Sheets

_US 10,635,403 B1_

QUANTUM RANDOM NUMBER GENERATOR

CROSS-REFERENCE TO RELATED APPLICATIONS

This application claims priority to U.S. provisional patent application Ser. No. 62/563,682, filed 27 Sep. 2017, which is hereby incorporate by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present disclosure relates to the field of random number generation, and more specifically to the generation of random numbers based on quantum mechanics.

BACKGROUND

Truly random numbers are utilized in many branches of science and technology, from fundamental research in quantum mechanics to practical applications such as cryptography, authentication, simulation, and gambling. Conventional quantum random number generators (QRNG) are used to yield random numbers for such applications, and are based on the physics of quantum mechanics which hold that a quantum state is truly random or an unreproducible source of true randomness.

Among various QRNG implementations, schemes based on photonic technology have drawn a lot of attention for high rates, low cost, and the potential of chip-size integration. Nevertheless, there are still practical challenges in these conventional systems. Specifically, conventional QRNG implementations have yielded nonuniform distributions that can lead to predictability, which is considered undesirable for efforts to yield true randomness.

Some conventional RNGs rely on very low photon fluences, and therefore require very low detector electrical noise. Other conventional RNGs may rely on current and voltage control of the local oscillator to adjust the measured noise in order to minimize classical noise sources. Conventional QRNGs that measure vacuum noise also rely on lasers to make the LO, which is costly and requires high power to drive the laser source.

SUMMARY

A system and method are provided to yield a QRNG based on homodyne detection of quantum noise (e.g., vacuum noise measured as shot noise) generated from a local oscillator, such as an LED. In one embodiment, a QRNG may be provided that is adjustable based on a control input to produce a random output that can be translated to one or more random data bits.

A QRNG in one embodiment is operable to generate one or more random bits of data. The QRNG may include a quantum noise source, a first detector, a second detector, a differential unit, and a control unit. The quantum noise source may be configured to generate an output having quantum noise. As an example, the quantum noise source may be an LED operable to generate a plurality of photons or a beam of photons having vacuum noise encoded in the shot noise of the beam.

The first detector may be configured to generate a first electrical signal that is representative of an intensity level of said output, and the second detector may be configured to generate a second electrical signal that is representative of an intensity of said output.

The differential unit, such as an electrical differential amplifier, may be configured to determine a difference between said first and second electrical signals, and to generate an output signal indicative of this difference between the first and second electrical signals. The control unit may be operably coupled to the differential unit, and configured to output at least one of the one or more random bits of data based on the difference between the first and second electrical signals, whereby the difference is indicative of quantum noise generated by the quantum noise source.

In one embodiment, the QRNG may be configured to control bias detected in the outputs of one or both of the first and second detectors. The control unit may be configured to analyze the difference signal output from the differential unit to determine if the noise is at a shot noise threshold or baseline level. If the noise is not at the shot noise level or threshold, the control unit may control a bias of one or both of the first and second detectors in an effort to bring the noise to the shot noise level. In one embodiment, bias may be controlled via an attenuator coupled to one or more of the detectors to affect an output of the one or more detectors; additionally, or alternatively, the attenuator may be configured to affect an input of the one or more detectors.

In one embodiment, the QRNG may include a beam positioner operably to affect a distribution of the beam output from the quantum noise source and received by the first and second detectors. In general, bias control can be optical, electrical, or both.

In one embodiment, a method is provided for generating one or more random bits of data. The method may include transmitting an output having quantum noise, generating a first electrical signal that includes the quantum noise of the output, and generating a second electrical signal that includes the quantum noise of the output. A difference may be determined with respect to the first and second electrical signals to generate a difference signal that is indicative of the quantum noise in the output. One or more random bits of data may be produced based on one or more samples of the difference signal.

In one embodiment, a QRNG is provided with a quantum noise generator configured to generate an output with quantum noise. The QRNG may include a detector operably coupled to the quantum noise generator, and configured to generate an electrical signal that is indicative of the quantum noise in the output. The detector may also be configured to determine if noise in the electrical signal is above a threshold level of shot noise. An output controller may be configured to adjust a distribution of the output on the least one of the detector in response to determining noise in the electrical signal is above the threshold level of shot noise.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

A system and method according to one embodiment are provided to yield a QRNG based on homodyne detection of quantum noise (e.g., vacuum noise measured as shot noise) generated from a local oscillator, such as an LED. In one embodiment, a QRNG may be provided that is adjustable based on a control input to produce a random output that can be translated to one or more random data bits. In one embodiment, the control input may form part of a feedforward control unit of the QRNG. Additionally, or alternatively, the control input may form part of a feedback control unit of the QRNG.

In one embodiment, the QRNG may include a quantum noise source configured to generate an output having quantum noise in the form of vacuum field fluctuations encoded in the random location of photons for high speed operation, which may be at least two orders of magnitude greater than a conventional QRNG. The randomness may be encoded on the shot noise on the output of a detector system. The quantum noise source in one embodiment may be a light emitting diode (LED) capable of generating photons affected by the vacuum field fluctuations. In one embodiment, the LED does not need to be shot noise limited if its noise is lower than the common-mode rejection of a homodyne detector.

The detector system in one embodiment includes a first detector and a second detector configured to receive the output generated from the quantum noise source. The first and second detectors may be configured to generate an electrical signal indicative of the intensity of the output generated from the quantum noise source. The first and second electrical signals may include a background signal superimposed with a quantum noise signal representative of the shot noise of the output of the quantum noise source. The background signal may be indicative of a baseline output of the quantum noise source, and may be substantially extracted from the first and second electrical signals to yield the quantum noise signal representative of the shot noise. The first and second detectors in one embodiment may be photo detectors.

In one embodiment, the detector system may include a difference unit configured to generate an electrical difference signal that is a difference between the first and second electrical signals output respectively from the first and second detectors. The difference unit may be a differential amplifier configured to generate the electrical difference signal.

The QRNG may include a control unit configured to generate a control input to affect a physical state of the QRNG, such as a position of the output of the quantum noise source relative to the detector system. As an example, the control input may form the basis for an adjustment in the position of the output of the quantum noise source relative to at least one of the first and second detectors.

Figure 1:
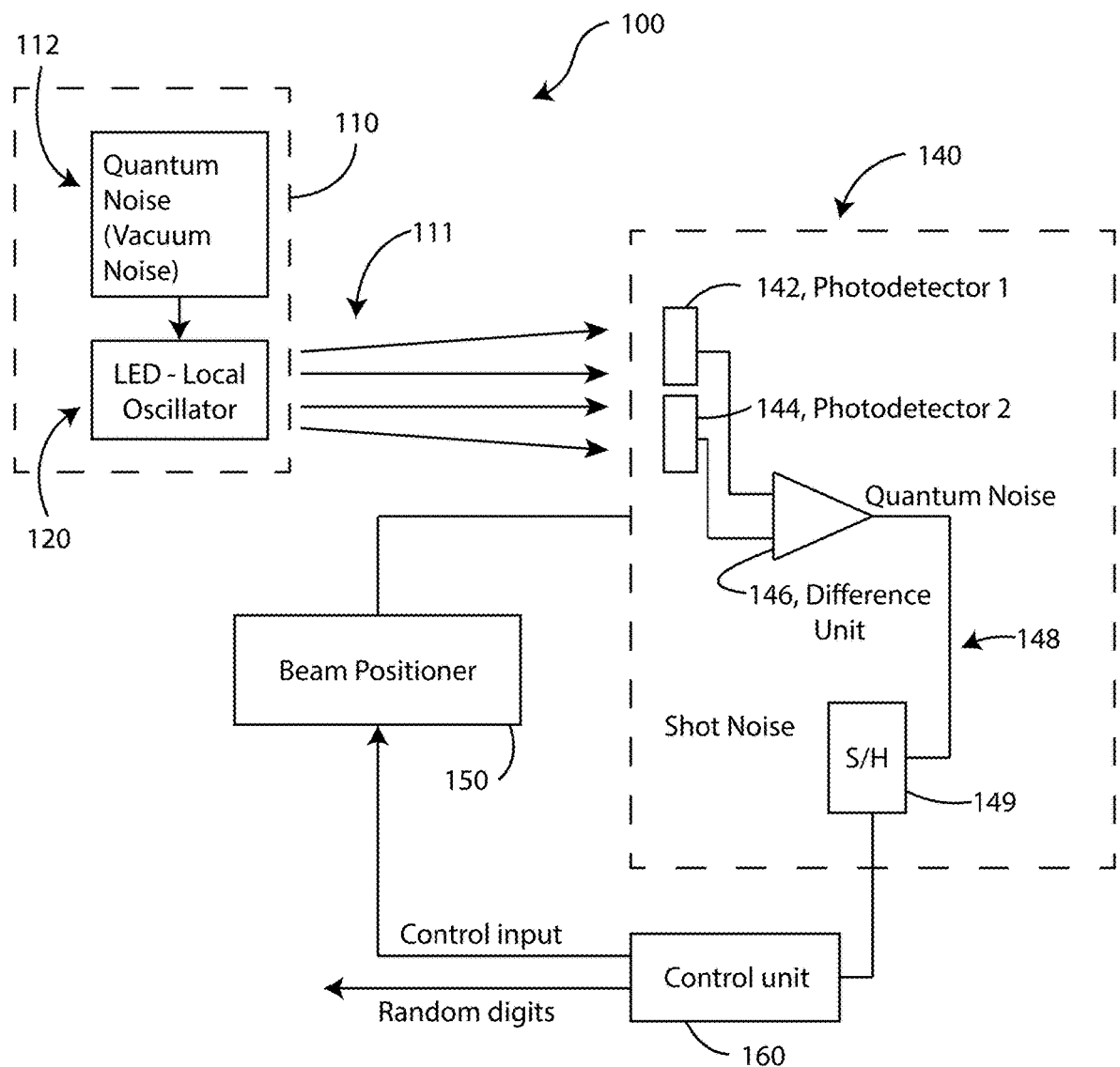
FIG. 1 shows a random number generator according to one embodiment of the present disclosure.

A RNG system in accordance with one embodiment of the present disclosure is shown in FIG. 1 and designated 100. The random number generator system 100 in the illustrated embodiment includes a quantum noise source 110 with a local oscillator 120, a detector 140, a beam positioner 150, and a control unit 160. The quantum noise source 110 may generate an output having quantum noise, which can be detected by the detector 140. A control unit 160 may monitor the output of the detector 140 to determine if a distribution of the noise detected by the detector 140 is consistent with the noise being truly random or substantially unbiased. If the control unit 160 determines otherwise (i.e., that the distribution of the noise is considered biased, to be predictable, or having characteristics of predictability, or a combination thereof) the control unit 160 may communicate a control signal to the beam positioner 150 to affect a position of the output of the quantum noise source 110 relative to the detector 140.

By repositioning the output of the quantum noise source 110 relative to the detector 140, the RNG system 100 may generate random digits having a distribution consistent with the random digits being truly random. It is noted that repositioning the output relative to the detector 140 may be conducted in a variety of ways, including adjusting at least one of a position of the output and one or more aspects of the detector 140. For instance, in the illustrated embodiment, the detector 140 includes first and second photodetectors 142, 144, one or both of which may be repositioned to affect the position of the output relative to the detector 140.

In the illustrated embodiment, first and second photo detectors 142, 144 of the detector 140 form part of a homodyne detector. The detector 140 may include a difference unit 146 capable of cancelling the classical noise present in an electrical signal generated from each of the first and second photodetectors 142, 144, generating a difference output substantially indicative of the quantum noise in the output of the quantum noise source 110.

The RNG system 100 may facilitate continuous state characterization and feedback control to remove bias (e.g., the propensity for the random number generator to prefer a particular outcome or to be unfairly sampled) in real-time. The detector 140 and control unit 160 may be configured to conduct continuous variable (CV) position-dependent measurements and detect bias in such measurements. The bias detection may form the basis for a control signal for an adjustment in the RNG system 100.

In one embodiment, optical or electrical attenuation (e.g., an optical or electrical attenuator) may be implemented in lieu of beam positioning. The attenuation may be controlled by the controller to balance the photocurrents produced by the two detectors for bias removal. The balanced photocurrents, upon subtraction, leave the shot noise level for registering and use of random numbers.

In one embodiment, the RNG system 100 may conduct a Bayesian binning procedure. For instance, in one embodiment, a Bayesian binning procedure may be conducted on a digitized output of the detector 140 to generate one or more random digits. In one embodiment, the quantum noise source 110 may be an LED operable as the local oscillator 120 in a homodyne detector.

The RNG system 100 in one embodiment may include a detector 140 with first and second photo detectors 142, 144 configured as photodiodes (in contrast to an imaging array) in a homodyne detection configuration. The light source used as a local oscillator (LO) in the homodyne detector is an LED. It is noted that a homodyne detector configuration may include an LO, a source (e.g. vacuum fluctuations), and a combiner configured to generate an output representative of the superposition of the LO output and the source output. In the illustrated embodiment, the output of the LO is superimposed automatically with vacuum fluctuations by nature of being split across two photo-detectors. In one embodiment, the act of splitting a beam of light across two photodetectors interferes the LO with the vacuum, such that an explicit combiner is not required.

The RNG system 100 in the illustrated embodiment may be configured to measure shot noise using homodyne detection of the vacuum field with an LED as the LO 120. This configuration may generate nine orders of magnitude greater photon fluence per unit of detection area over conventional systems. With the RNG system 100 use of LEDs as an LO 120 is enabled with minimal requirements over the technical noise properties and minimal control over the supply current and voltage through the use of homodyne photodetection. This configuration is much lower cost than conventional QRNGs. This capability is enabled by differencing the photocurrents in the homodyne detector, removing classical noise on the LED (e.g., the LO 120) and leaving substantially only the vacuum noise level, which may be measured as the shot noise of the sum of the two diode photocurrents. One embodiment according to the present disclosure enables use of bright LEDs operating at mW optical powers to serve as a local oscillator 120 for facilitating detection of vacuum noise, which can form the basis for generation of random digits from the RNG system 100.

In one embodiment of the present disclosure, the detector 140 may be configured to measure shot noise based on a continuous variable property (e.g., shot noise) that can be detected in the output received by the detector 140. For instance, the continuous variable property may be based on the quantum statistics in a light field, specifically the quantum vacuum, and not on the properties of a single or small number of photons. It is noted that, as the number of photons incident on a beam splitter becomes very large, the variance in the number of photons is equal to that of a Poisson distribution. A variance that scales with photon number indicates that much more than a single bit per measurement can be obtained. Because these statistics are guaranteed to be random by the laws of physics, the statistics can be directly sampled to produce random numbers. It is significantly more feasible and cheaper to make a large number of photons than to make a single photon, enabling the detector 140 in the illustrated embodiment to register the quantum statistics of large photon numbers in a much less expensive configuration than a single photon detector by orders of magnitude.

The detector 140 in one embodiment is also simpler and less expensive than other imaging sensors such as CCDs or CMOS arrays.

In one embodiment, the RNG system 100 may measure photon number variance (e.g., shot noise) directly in a detector 140, such as a photodiode or array of photodiodes. This is in contrast to a conventional which-way optical device that determines whether a single photon travels one way or another based on its quantum state.

In one embodiment, the RNG system 100 may utilize the beam positioner 150 to affect a distribution of photons output from the quantum noise source 110 and received by the detector 140. Positioning of the beam or output from the quantum noise source 110 may be used to extract randomness, rather than a slower conventional which-way optical device. Positioning an optical beam or field on a segmented detector or multiple detector elements is considered mathematically equivalent to placing an optical beam (or any collection of photons) on a beam splitter or other device that gives which-way information (a which-way optical device).

Sampling of the output of the quantum noise source 110 (e.g., the photon distribution of the beam) may be conducted by the detector 140. In one embodiment, the detector may be configured to detect the photons output from the quantum noise source 110 with a spatial-filtering detector, such as a quadrant photodiode or a split detector configuration. The first and second photodetectors 142, 144 incorporated into the detector 140 may form such a spatial filtering detector in one or more embodiments described herein. It is noted that the split in the split detector configuration (e.g., a split diode configuration) may be considered a type of beam splitter, where the photons in the beam of light have equal chance to fall on the left side or the right side.

It is noted that the present disclosure is not limited to a detector 140 with a split configuration; sampling of the output of the quantum noise source 110 may be performed by a detector 140 having more than one photo detector (e.g., more than one diode) to detect the incident light. At least a first and second photo detector may not share the same diode or share a split diode. For instance, the first and second photo detector may be completely independent of one another.

Figure 6:
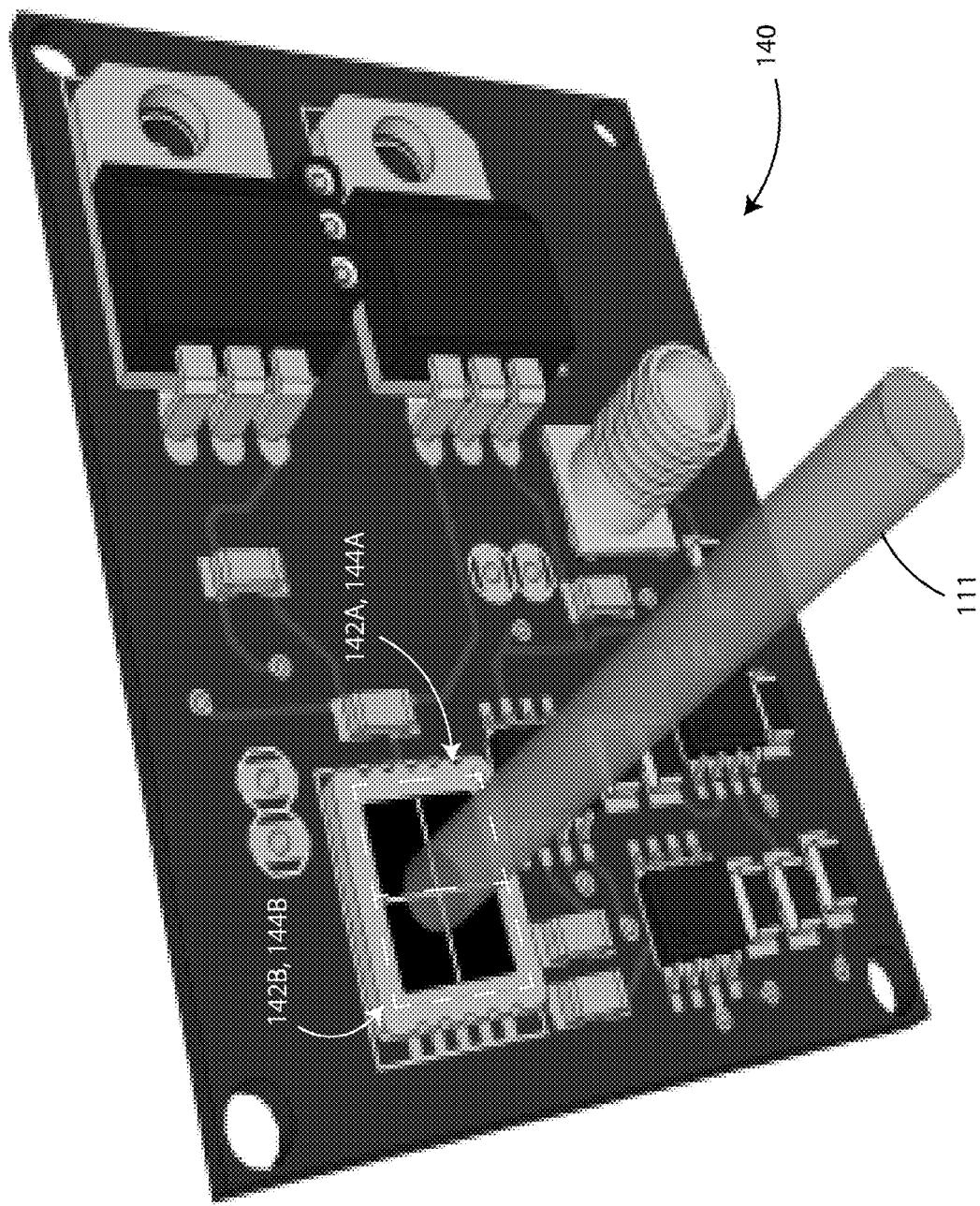
FIG. 6 shows a detector for a random number generator in accordance with one embodiment.

The present disclosure is also not limited to a detector 140 with first and second photodetectors 142, 144. The detector 140 may be considered a type of spatially resolving detector that with higher spatial resolution yields a higher number of bits per photon. In one embodiment of the RNG system 100, at least two bits are obtained per sample, which can be considered similar to two QRNGs running in parallel. An example of such a spatially resolving detector is depicted in the illustrated embodiment of FIG. 6 with a four quadrant detector having four photo detectors capable of generating two quantum noise signals by feeding the outputs of two of the four photo detectors 142A, 144A to a first differencing unit 146 and the outputs of the other two photo detectors 142B, 144B to a second differencing unit 146. As seen in the illustrated embodiment of FIG. 6 the output of a quantum noise source is directed to the four quadrant detector to facilitate generation of random numbers.

As discussed herein, the quantum noise or shot noise detected by the detector 140 may have a Gaussian noise distribution. In other words, sampling of the continuous variable output of the detector 140 may yield a Gaussian-random distributed continuum of possibilities. Fair sampling of the photon number statistics allows on the order of 10 or more bits per sample. Due to the Gaussian nature of the quantum noise detected as a continuous variable by the detector 140, the RNG system 100 may be capable of scaling to multiple bits per sample.

I. Quantum Noise Source

The quantum noise source 110 may be configured to generate an outlet 111 with a plurality of quantum entities (e.g., photons) encoded with quantum noise 112, such as vacuum field fluctuations. The quantum noise source 110, for instance, may include a local oscillator 120 with an output configured to produce a plurality of quantum entities in the form of photons, on which the quantum noise 112 may be encoded. The output of the local oscillator 120 may be inherently encoded with the quantum noise 112. Alternatively, the output of the local oscillator 120 may be combined with the quantum noise via a beam combiner.

The local oscillator 120 or LO 120 in the illustrated embodiment is configured as an LED. The LED may be configured to generate photons in operation at mW optical powers to facilitate detection of vacuum noise. The local oscillator 120 in one embodiment may enable continuous variable detection of the vacuum noise based on homodyne detection of the vacuum noise from the output of the local oscillator 120. The vacuum noise may be measured as the shot noise of the output from the homodyne detection.

The output 111 of the quantum noise source 110 in one embodiment, as discussed herein, may be considered a beam of photons derived at least in part, optionally entirely, from the LO 120. The beam may be derived from any light source that can serve as an LO for vacuum field detection. This includes any LED that has excess classical (or thermal) noise that is smaller than the common mode rejection ratio of the homodyne detector. It is noted that a homodyne detector may be configured with a target common-mode rejection that is compatible with a particular LED. Because classical noise in an optical beam may be detected equally by two photodetectors configured to do so when the beam is split across both detectors equally, and may produce two photocurrents with correlated classical noise, the classical noise may be subtracted from the electrical signal after differencing them if the total classical noise is smaller than the common mode rejection capability of the circuit. Quantum noise, such as the vacuum noise, is unaffected by common-mode rejection and therefore is left behind in the signal if the detector's common mode rejection ratio is larger than the classical noise level. One embodiment according to the present disclosure provides such a homodyne detector (e.g., detector 140) and with an off the shelf LED as the LO 120 to observe shot noise, which samples noise from the quantum vacuum fluctuations as depicted in the illustrated embodiment of FIGS. 3 and 4.

Figure 3:
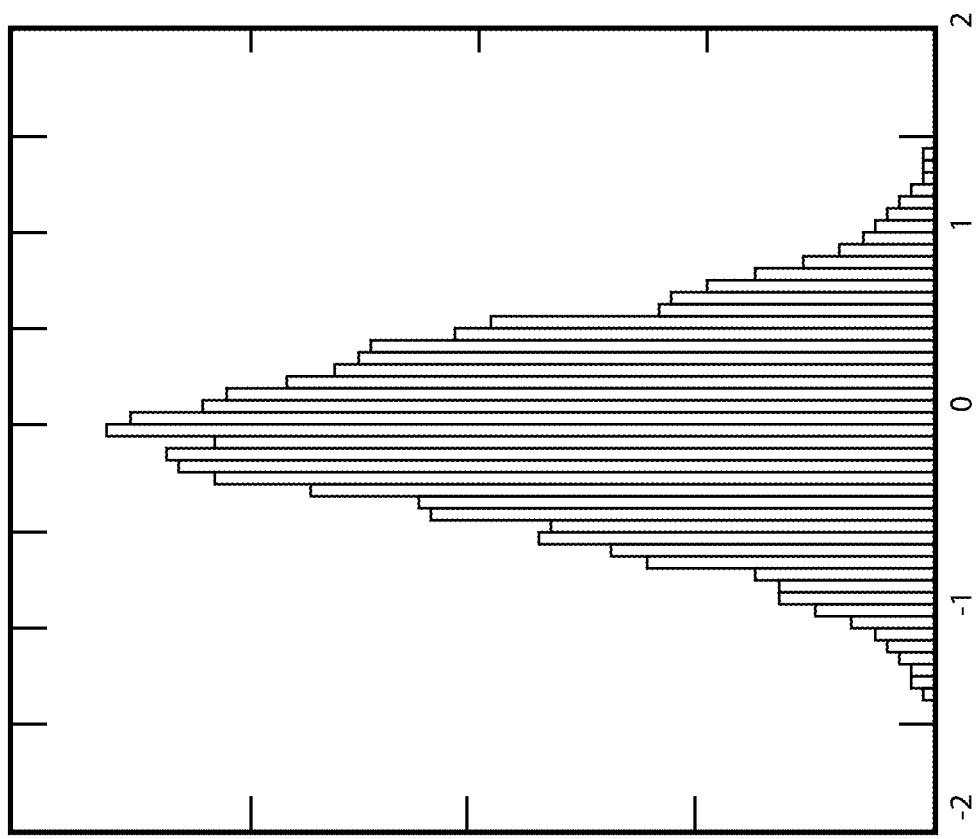
FIG. 3 depicts a Gaussian distribution of samples of random data.
Figure 4:
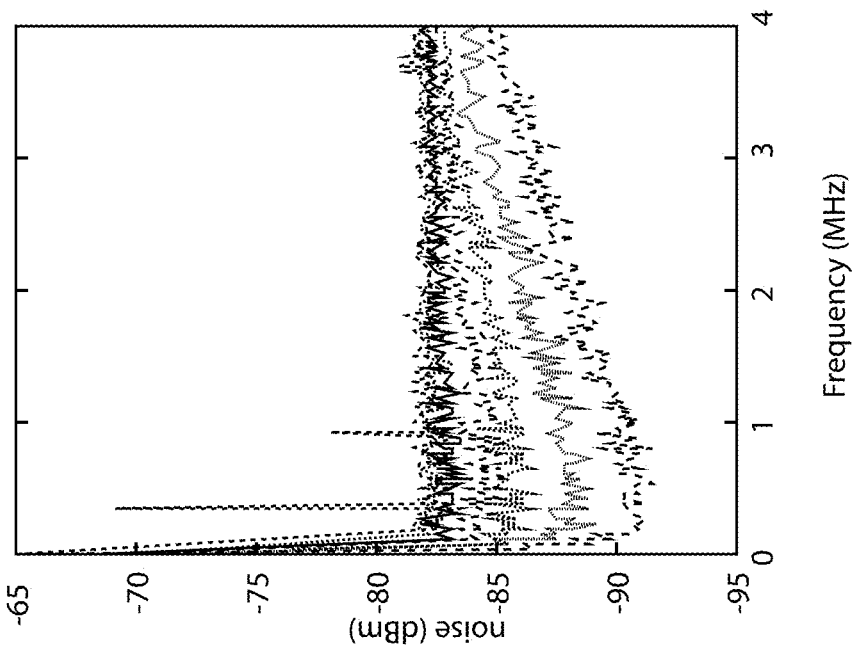
FIG. 4 shows broadband noise spectrum for an LED.

FIG. 3 shows the broadband noise spectrum for the LO 120 in the form of an LED (e.g., a blue LED) measured on a balanced photodetector for variable optical powers. FIG. 4 shows average measured noise power (raw noise) of the data depicted in FIG. 3, and electronics noise corrected average noise (shot noise), illustrating a linear dependence of noise on optical power, and demonstrating that the detector 140 in accordance with one embodiment may be used in conjunction with an LO 120 in the form of an LED to measure photo shot noise as quantum noise. This photon shot noise may serve as the basis for extracting a true random number in the RNG system 100.

II. Detector

In the illustrated embodiment, the output from the quantum noise source 110 is provided to the detector 140, which may be configured to extract the quantum noise of the output from the quantum noise source 110 and to generate randomness therefrom. The detector 140 may be configured to generate an electrical signal 148 indicative the quantum noise in the output of the quantum noise source 110.

The electrical signal indicative of quantum noise may be an analog signal, which can be sampled by a sampling circuit 149 (or analog-to-digital converter [ADC]) to facilitate generating bits of randomness.

The detector 140 in the illustrated embodiment includes a plurality of photodetectors 142, 144 that respectively sense the output of the quantum noise source 110. For instance, the detector 140 may include a first photodetector 142 and a second photodetector 144 configured to generate respectively first and second electrical signals representative of an intensity level (e.g., light intensity) of the output of the quantum noise source 110.

In the illustrated embodiment, the position of at least one of the quantum noise source 110, the first photodetector 142, and the second photodetector 144 may be controlled to affect the amount of light detected by each of the first and second photodetectors 142, 144 that is output from the quantum noise source 110. In one embodiment, the position may be controlled such that the amount of light ultimately detected by the first photodetector 142 is substantially equal to the amount of light ultimately detected by the second photodetector 144.

The electrical output of each photodetector 142, 144 may have a very large DC background (e.g., a constant voltage). Within this electrical output is a very small fluctuation representing the quantum noise from the output of the quantum noise source 110. To remove the strong DC background and measure the small quantum noise, the outputs of the first and second photodiodes 142, 144 may be provided to a difference unit 146, such as an electrical differential amplifier. The difference unit may be implemented by a simple circuit junction at which two photocurrents of opposite polarity meet. The junction may occur before a signal amplifier. The strong DC background at least in part is the result of the local oscillator 120 being much stronger or more intense than the quantum noise 112. By using balanced detection, the strong DC background can be canceled out, enabling effective detection of the relatively small quantum noise.

The strong DC background (which is considered to be substantially the same for the two outputs of the first and second photodetectors 142, 144) can be canceled out with the difference unit 146, leaving the quantum noise measured by the first and second photodetectors 142, 144. This configuration with first and second photodetectors 142, 144 and the difference unit 146 can be considered a balanced photoreceiver. The analog output of the difference unit 146 can be used directly in one or more applications as a truly random source; or as discussed herein, the analog output can be digitized with a sampling circuit 149.

Figure 2:
FIG. 2 shows a uniform distribution of samples of random data.
Figure 5:
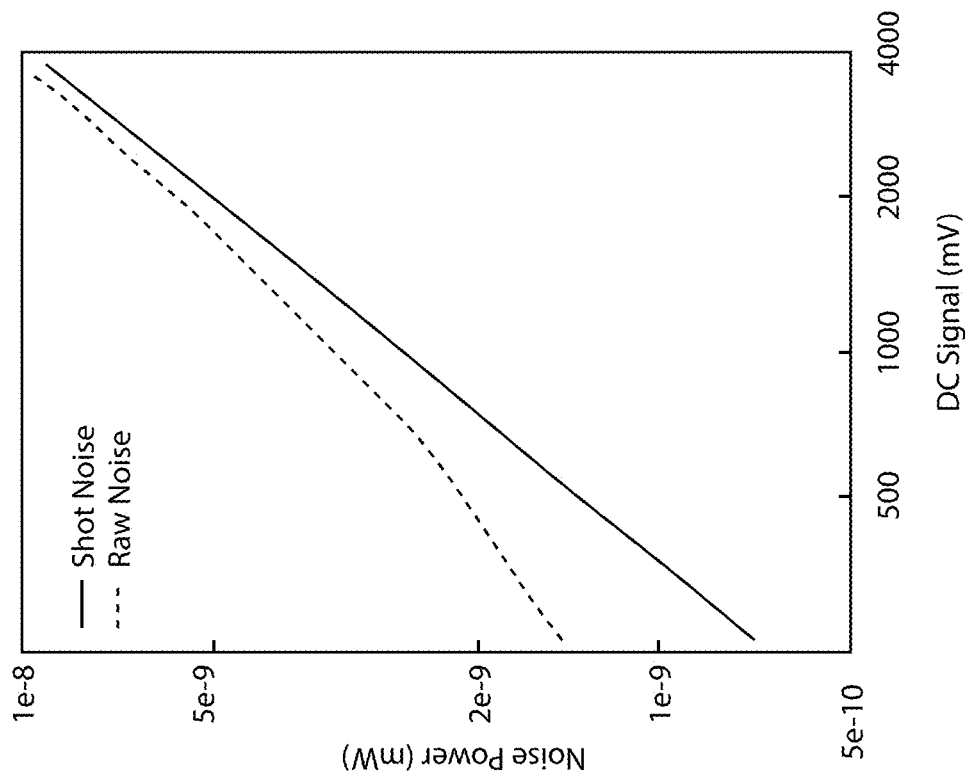
FIG. 5 depicts average power of noise of the noise shown in FIG. 4 and shot noise.

An RNG system 100 in accordance with one embodiment is configured to generate a plurality of samples of the quantum noise signal 148. The sampling circuit 149 may sample the quantum noise signal 148 at a sampling rate that can be selected based in part on the bandwidth of the first and second detectors 142, 144. A histogram of the raw data obtained from the sampling circuit 149 and that is binned in accordance with one embodiment of the present disclosure is shown in FIG. 2. As can be see, the histogram of the sampled data after binning fits a Gaussian distribution. This is in contrast to a conventional which-way detector having two possible outputs (0, 1) and configured to try to achieve a uniform distribution similar to the one shown next to the Gaussian distribution in FIG. 2.

In other words, a histogram of output from the detector 140 configured as a homodyne detector according to one embodiment is depicted in the illustrated embodiment of FIG. 2. As can be seen, X-axis values corresponding to the analog output of the electrical differential amplifier 146 are in the range of −2 to 2 centered about 0. The Y-axis corresponds to the number of measurements made with respect to a subset of X-axis values. The histogram shows a Gaussian distribution of the random numbers generated by the RNG 100. For instance, most of the measurement results are close to zero. This means the intensity levels received by the first and second photodetectors 142, 144 are almost the same, so the differential signal is about zero.

While the Gaussian distributed raw data output from the detector 140 to the control unit 160 is useful in certain applications, uniformly distributed random bits are more common commercially. The Gaussian output of the detector 140 in one embodiment may be transformed to yield such a uniform distribution of random bits. In one embodiment, the Gaussian raw data may be applied to a voltage comparator, which is essentially a 1-bit ADC. By balancing the efficiencies of the two photodiodes 142, 144 of the detector 140 and selection of a suitable threshold voltage, one random bit can be generated from each raw sample. To enhance the random number generation rate, multi-bit ADC can be employed.

In one embodiment of the RNG 100, the sampling circuitry 149 may operate in conjunction with binning circuitry that may convert an analog input (from the differential unit 146) into one of a plurality of output bins (e.g., 256 ($2^8$) output bins). The widths of the output bins may be tailored so that the Gaussian distributed analog input results in a digital output uniformly distributed among the 256 bins. In one embodiment of this approach, 8 random bits may be generated per detection. In one embodiment, as mentioned herein, the binning circuitry may conduct a Bayesian binning procedure.

In one embodiment of the RNG 100, the sampling circuit 149 may have an equal bit size, such that the digital outputs (raw samples) are not uniformly distributed. A Toeplitz-hashing extractor may be provided to generate binary random bits from the raw samples (e.g., 8-bit raw samples) to yield a substantially uniform distribution of random bits.

For instance, the 8-bit output of the ADC can be represented as random variable X. The maximum number of random bits that can be extracted from each 8-bit raw sample is lower bounded by the minimum-entropy of X, which is defined as:

$$H_{min} = -\log_2(P_{max}), \tag{4}$$

where $P_{max} = \max_{x \in [0,1]_s} \Pr[X=x]$ quantifies the maximal probability that X is one of the $2^8$ binary sequences. Using equation (4), the minimum-entropy of the raw data can be determined as $H_{min}=6.4$. In the asymptotic case, an average 6.4 random bits can be generated from each 8-bit raw sample, corresponding to an efficiency of 0.8 bits per raw bit. If the untrusted technical noise of the system makes a significant contribution to the output, conditional minimum-entropy may be employed to estimate the extractable randomness.

In one embodiment, the Toeplitz-hashing extractor may be applied to generate nearly perfect random bits from the raw data of the detector 140. The Toeplitz-hashing extractor may extract an m-bit random sequence by multiplying an n-bit raw sequence with an n-by-m Toeplitz matrix. The Toeplitz matrix may be constructed from a long (n+m−1 bits) but a reusable random seed. For instance, m=256 and n=400 may be selected with an efficiency of 0.64 bits per raw bit (or 5.12 bits per raw sample). According to the leftover hash lemma, the security parameter E of the randomness extractor can be determined by:

$$m = n \frac{H_{min}}{8} - 2\log_2\left(\frac{1}{\varepsilon}\right). \tag{5}$$

Using n=400, m=256, and $H_{min}$=6.4, the security parameter can be determined to be $\varepsilon=2^{-32}$, which means the statistical distance between the extracted random sequence and the perfect random sequence is bounded by $\varepsilon=2^{-32}$.

III. Control Unit

The RNG system 100 in the illustrated embodiment may include a control unit 160 capable of processing the digitized output of the detector 140, such as the output from the sampling circuit 149, to communicate one or more random digits for consumption by another component or device. It should be noted that the present disclosure is not limited to the control unit 160 being configured to receive the digitized output from the sampling circuit 149 of the detector 140; the control unit 160 may be operably coupled to any one or more aspects of the detector 140 to receive information for processing. For instance, the control unit 160 may be operably coupled to one or both outputs of the photo detectors 142, 144, or the output from the difference unit 146. The control unit can receive analog signals and act on them to initiate correction procedures which affect analog signals before digitization, as well.

In one embodiment, data post-processing can be applied to the digitized output of the sampling circuit 149 to generate random numbers in a target format (for example, binary random numbers).

In one embodiment, the control unit 160 may be configured to generate one or more parameters indicative of the randomness of the output from the detector 140. These one or more parameters may be processed or compared against one or more criteria to generate one or more control signals (e.g., a feedforward control signal or a feedback control signal, or both).

In one embodiment, the control unit 160 may include a shot noise detector configured to determine if the output from the detector 140 is indicative of its detected noise (e.g., a noise indicator as a parameter) being above a shot noise level or threshold (e.g., a shot noise level as a criterion). If the output is indicative of the shot noise being above the shot noise level, a shot noise control signal may be output indicative of the deviation. As discussed herein, such a shot noise control signal may be provided to a beam positioner 150 configured to affect operation of the RNG system 100. Such a control signal may also be applied to optical or electrical attenuators to balance the photocurrents before the subtraction unit in lieu of or in addition to beam positioning.

The shot noise detector in one embodiment may process the incoming noise (provided as digitized data from the sampling circuit 149 or in analog form as the quantum noise signal 148) against a detector calibration value (or shot noise level) to determine whether the incoming noise is shot noise. The calibration value may be determined from characterizing the electrical noise levels produced by the detector upon detecting the optical field. The detection mechanism may exploit the functional dependence of shot noise on input optical power as being linear, while classical noise is not. Upon obtaining a linear curve fitting of the noise to the input power, characterized by some parameter such as voltage, the detector shot noise level is thereby calibrated. If the noise level is above the calibrated level for a given input power (characterized by some analog or digital parameter such as voltage), then a control signal is generated. The shot noise detector may generate one or more parameters in accordance with whether the incoming noise is shot noise, and optionally, indicative of a deviation of the incoming noise from shot noise. The one or more parameters determined in the control unit 160 by the shot noise detector may be translated to one or more control signals provided to affect operation of the RNG system 100.

For instance, as discussed herein, the control unit 160 may generate a bias control signal to affect a bias of signals output from the detector 140 or components of the detector 140 (e.g., the first and second photodetectors 142, 144). As another example, the control unit 160 may generate a beam position control signal to affect a distribution of photons received by the detector 140 from the quantum noise source 110.

In one embodiment, if the shot noise detector determines the incoming noise is above a shot noise level, the control unit 160 may generate a control signal, such as a beam position control signal to adjust the position of the optical beam output from the quantum noise source 110 to cancel the excess noise, ensuring substantially random numbers continued to be produced. The control unit compares the previously calibrated shot noise level (described herein) to the currently measured noise level. If the currently measured noise level is different from the shot noise level, the control unit issues a control voltage to the beam position, or alternatively or in addition to, the optical or electrical attenuators until the measured noise level is substantially equivalent to the calibrated shot noise level for the given input parameter, in terms of optical power or digital or analog voltage.

In one embodiment, if the entropy of the number distribution output from the detector 140 does not satisfy one or more criteria or requirements, information indicative of the noncompliance may be fed back to the beam positioner 150, enabling the beam positioner 150 to use the information as a basis for improving the entropy. An example of entropy requirements may include the ENT randomness tests or the NIST randomness tests, running onboard the QRNG on a microprocessor analyzing digital data provided by the device. For example, the minimum entropy per bit calculated by ENT may be used to produce a control signal when the minimum entropy falls below a threshold value. A threshold of 6 bits per byte may be used as a threshold. In general, the threshold is commensurate with the requirements of the extraction procedure, such as Toeplitz. Another criterion of the output distribution is minimal autocorrelation. If the output random number distribution shows significant autocorrelations, then it may be determined not to be random. A distribution containing high periodicity may also be determined not to be random. For example, when examining a spectral decomposition of a noise signal, a sharp spectral peak is indicative of perdiocity. On the other hand, a flat spectrum, known as "white noise" is indicative of non-periodic noise and can be classified as random.

The control unit 160 includes any and all electrical circuitry and components to carry out the functions and algorithms described herein. Generally speaking, the control unit 160 may include one or more microcontrollers, microprocessors, and/or other programmable electronics that are programmed to carry out the functions described herein. The control unit 160 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the control unit 160, or they may reside in a common location within the control unit 160. When physically distributed, the components may communicate using any suitable serial or parallel communication protocol, such as, but not limited to, CAN, LIN, FireWire, I2C, RS-232, RS-485, and Universal Serial Bus (USB).

IV. Bias Control

In one embodiment, the control unit 160 may be configured to generate a control signal that affects the photocurrents after the photodiodes (e.g., the respective outputs of the photo detectors 142, 144) in the detector 140 before differencing in the differential unit 148. For instance, such a photodetector affecting control signal or a bias control signal may be generated to substantially ensure that the differenced photo current or the quantum noise signal 148 is limited by shot noise. In this way, as discussed herein, bias can be detected and removed before data binning is conducted (e.g., before the quantum noise signal 148 has digitized the sampling circuitry 149 and/or before the output from the sampling circuitry 149). As a result, in one embodiment, there is a significant reduction in the requirements placed on post processing extractors. That is, in one embodiment, the RNG system 100 can achieve much higher bit rates due the much higher bandwidth of the detector 140 and the self-correcting algorithm to detect and remove bias before data processing to yield one or more random digits. The RNG system 100 may yield random numbers within one or more randomness criteria in real time with bias correction in real time.

The control unit 160 in one embodiment may generate the bias control signal based on a feedback algorithm. As an example, the feedback algorithm may generate a shot noise deviation signal or output indicative of a difference between a) a shot noise threshold and b) a shot noise level determined from one or more aspects of the detector 140, such as the digitized output from the sampling circuit 149. This shot noise deviation signal may be translated to a voltage control input (e.g., via one or more translation algorithms or translation circuitry, or a combination thereof). Alternatively, the shot noise deviation signal may be provided directly as the voltage control input.

An example of signal translation may occur in a microcontroller. A microcontroller may hold in memory a calibration of the shot noise. The microcontroller may be provided with the noise signal continuously as the detector runs. The microcontroller may perform a mathematical differencing operation on the input noise signal and the calibrated shot noise level. The microcontroller may output a digital logic signal which serves as a programming signal for a programmable variable voltage attenuator. For example, such an attenuator may have a resolution of 0.1 or 0.01, or any number of dB attenuation, controlled by the digital output of the microcontroller. The microcontroller and variable attenuator may be off-the-shelf components and may be affixed directly to the QRNG/detector circuit board.

In another example, the signal translation may occur in an analog feedback loop. A proportional-differential-integrative (PID) gain controller may output an analog voltage signal. It may receive as input the voltage signal corresponding to the difference in optical powers between the detectors. The difference signal corresponds to a given noise level. After the calibration procedure, only a single analog voltage corresponds to the shot noise level. The difference signal serves as an error signal for the PID controller. The output of the PID controller is used to provide a voltage to a variable voltage attenuator, or any method of controlling analog photocurrents, including by position or attenuating the optical beams or by attenuating electrical photocurrents. The PID controller seeks to minimize the error signal in a fashion typical of state of the art PID controllers. Since the error signal contains the shot noise, the PID controller drives the detection apparatus towards detection of shot noise.

In the illustrated embodiment, the detector 140 may include a voltage-based attenuator disposed between the output of each respective photodetector 142, 144 and the difference unit 146. Alternatively, one voltage-based attenuator may be provided between one output of one of first and second photodetectors 142, 144. This way, photocurrent of one or more diodes of the first and second photodetectors 142, 144 may pass through the attenuator, which can be adjusted in order to substantially equalize photocurrents before differencing in the difference unit 146. The voltage-based attenuator in one embodiment may be configured to increase or decrease a signal bias (e.g., a current bias or a voltage bias, or both) of one or more respective outputs from the first and second photodetectors 142, 144. Although the voltage-based attenuator is described as being responsive to a voltage control input to affect a signal output from one or more of the photodetectors 142, 144; however, the voltage-based attenuator may be configured differently, such as a current-based attenuator.

In one embodiment, the voltage control input provided from the control unit 160 to the voltage-based attenuator may be generated from the feedback algorithm conducted by the control unit 160. As discussed herein, the control unit 160 may be an attendant FPGA, computer, microcontroller, or analog lock loop, which outputs a voltage control signal to the voltage-based attenuator based on one or more parameters measured from any one or more aspects of the detector 140, such as a shot noise level.

In one embodiment, the one or more respective diodes of the first and second photodetectors 142, 144 may be provided in an integrated package as in a split construction, such as a split photodiode construction in the case of first and second respective photodiodes of the first and second photodetectors 142, 144.

As discussed herein, one or more attenuators may be disposed between the respective outputs of the first and second photodetectors 142, 144 and the difference unit 146. The difference unit 146 may be configured to generate the quantum noise signal 148 based on a difference between the outputs received from the first and second photodetectors 142, 144. In some cases, bias may present itself in the output of one or both of the first and second photodetectors 142, 144. Reasons for bias may include slight misalignment between output of the quantum noise source and one or both of the photodetectors 142, 144. Bias may result in classical noise being output from the difference unit 146 in addition to the shot noise or quantum noise, adversely affecting the quality of the randomness output from the RNG system 100.

Subtraction of classical noise, possibly optimal subtraction of classical noise, to reach the photon shot noise level from the difference unit 146 in one embodiment may be based on feedback from the control unit 160 to control the output (e.g., the photocurrent) generated by each element of the split construction. For instance, the control unit 160 may include a bias removal algorithm to affect attenuation of one or more outputs from the split construction. The control unit 160, as discussed herein, may be embodied as an FPGA on a compact board integrated with the photo detection circuitry. The FPGA may operate to perform the bias removal algorithm by analyzing the voltage readout of the split detector 140 to ensure that the detected noise is truly quantum mechanical in nature. If an imbalance in the detector 140 causes bias, the algorithm may detects this via increased voltage in one channel or increased variance in the resulting waveform. After detection, a variable attenuator on the detector board may be adjusted so that the noise returns to the quantum limit in what is essentially a lock loop. This way, an integrated bias detection and removal mechanism may be provided. The power requirements for the algorithm operated in in accordance with one embodiment may be three orders of magnitude less than conventional implementations, and the size of the feedback controller can be reduced from the size of a typical computer down to a small chip approximately 2 $cm^2$.

In an alternative embodiment, the optical powers before photodetection can be controlled with controllable optical attenuators placed in front of each diode. In other words, rather than affecting the output of one or more of the diodes of the first and second photo detectors, the input detected by the one or more diodes may be controlled to affect the output.

Attenuation of one or more aspects of the detector 140, including one or more inputs or one or more outputs, or a combination thereof, may facilitate substantial removal of bias. This way, the detector 140 may be configured as a homodyne detector capable of measuring vacuum noise by detecting shot noise of the photo currents in the photodetectors. Several attenuation embodiments are described, and are considered compatible with an LED light source as the local oscillator for the source of photons from the quantum noise source 110. One or more methods described herein may support a feedback system by which the quality of the random numbers and the nature of the noise is used to feedback onto the measurement apparatus (e.g., the detector 140).

V. Beam Positioner

In one embodiment of the RNG system 100, a beam positioner 150 may be provided. The beam positioner 150 may be configured to affect the distribution of the output from the quantum noise source 110 on the detector 140. For instance, the beam positioner 150 may move the light distribution relative to respective photodiodes of the first and second photodetectors 142, 144. A light steering component may be incorporated into or operably coupled to the beam positioner 150 in order to move the light distribution. For instance, the light steering component may be a digital micro mirror (DMM) array, which can be controlled by the control unit 160 to affect the light distribution or intensity of light received from the quantum noise source 110 by the first and second detectors 142, 144. In one embodiment, the DMM array may be controlled to send the proper light intensity to the proper diodes for shot noise measurement.

The beam positioner 150 in one embodiment may facilitate self-correction control of the RNG system 100. For instance, a beam position control signal may be generated by the control unit 160 and provided to the beam positioner 150 to affect the position of at least one of the quantum noise source 110, the output of the quantum noise source 110, the first photodetector 142, and the second photodetector 144. The beam position control signal may enable the control unit 160 to vary the distribution of the output of the quantum noise source 110 (e.g., the light distribution) on at least one of the first and second photodetectors 142, 144. As another example, the beam positioner 150 may enable the RNG system 100 to control the beam positioning of the output from the quantum noise source 110 on the detector 140, such that different optical powers can fall on different diodes of the detector 140 and cancel in order to remove classical noise and leave quantum noise.

In one embodiment, the DMM may facilitate measuring the random noise fluctuations in a beam of light based on its position within the beam. This is because the DMM is a spatial light modulator. Such an amplitude-modulating spatial light modulator can be configured to perform the action of a beam splitter. Furthermore, it is notable that a beam of light which embodies a coherent state of the optical field, such as the vacuum field, is limited in its fluctuations by shot noise across all spatial configurations and spatial modes. That is, a coherent state can show vacuum noise fluctuations in its time-varying intensity, and also in its spatially-varying intensity. Furthermore, the Hermite-Gauss spatial modes basis that characterize the modes of lasers have photons spatially distributed within their spatial extents in a Gaussian-random-distributed way. A local oscillator may be constructed that samples any spatial configuration of the vacuum by configuring the spatial properties of the LO accordingly. For example, a beam of light may be provided whose spatial modes can be expressed in the Hermite Gauss or any other basis, including the basis that corresponds to the modes of the photodetectors, and split such a beam of light evenly across a spatial filter, DMM, beamsplitter, or any other spatially-resolving filter such that equal measures of optical power are output on two or more ports of the device. The difference of the optical signals may be used to sample vacuum noise, or shot noise, in either or both the spatial and time domains. Such measurements may form the basis for one or more parameters utilized by the control unit 160 to affect operation of the RNG system 100.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A random number generator (RNG) operable to generate one or more random bits of data, said RNG comprising:
   a quantum noise source configured to generate an output having quantum noise;
   a first detector configured to generate a first electrical signal that is representative of an intensity level of said output;
   a second detector configured to generate a second electrical signal that is representative of an intensity of said output;
   a differential unit configured to determine a difference between said first and second electrical signals; and
   a control unit operably coupled to said differential unit, said control unit configured to output at least one of the one or more random bits of data based on said difference between said first and second electrical signals, wherein said control unit includes a shot noise detector configured to determine if said difference between said first and second electrical signals is indicative of shot noise being above a shot noise level,
   whereby said difference is indicative of quantum noise generated by said quantum noise source.

2. The RNG of claim 1 wherein said quantum noise source includes a local oscillator configured to produce light output, wherein said output of said quantum noise source is based on said light output and includes vacuum noise.

3. The RNG of claim 2 wherein said local oscillator is a light emitting diode (LED).

4. The RNG of claim 3 wherein said vacuum noise of said output is generated from said LED as part of said light output.

5. The RNG of claim 1 comprising an attenuator operably coupled to at least one of the first and second beam detectors and said control unit, said attenuator configured to affect one or more of an input or output of the at least one of the first and second beam detectors based on bias detected by said control unit.

6. The RNG of claim 1 wherein said difference between said first and second electrical signals is indicative of the shot noise with respect to the quantum noise provided by the quantum noise source.

7. The RNG of claim 1 wherein said first and second detectors form a homodyne detector, wherein the first electrical signal and said second electrical signal include a background signal superimposed with a quantum noise signal of a vacuum field.

8. The RNG of claim 7 wherein said quantum noise signal is extracted as the shot noise from said first and second electrical signals.

9. The RNG of claim 1 wherein said differential unit is a differential amplifier configured to output a differential electrical signal that is representative of said difference between said first and second electrical signals.

10. The RNG of claim 9 wherein said differential electrical signal sampled to generate the one or more random bits of data.

11. The RNG of claim 1 comprising a beam positioner configured to control a position of said output from said quantum noise source relative to said first and second detectors.

12. The RNG of claim 11 wherein said beam positioner is operably coupled to said control unit, said control unit configured to direct said beam positioner to adjust said position of said output relative to at least one of said first and second detectors based on a determination that said difference is indicative of the shot noise being above said shot noise level.

13. The RNG of claim 12 wherein said beam positioner is configured to adjust a position of said at least one of said first and second detectors in order to adjust said position of said output relative to said at least one of said first and second detectors.

14. A method of generating one or more random bits of data, said method comprising:
   transmitting an output having quantum noise;
   generating a first electrical signal that includes the quantum noise of the output;
   generating a second electrical signal that includes the quantum noise of the output;
   differencing the first and second electrical signals to generate a difference signal that is indicative of the quantum noise in the output;
   determining if the difference between the first and second electrical signals is indicative of shot noise being above a shot noise level; and
   producing one or more random bits of data based on one or more samples of the difference signal.

15. The method of claim 14 comprising:
   said transmitting including transmitting a light output from a light emitting diode (LED);
   providing a first detector configured to generate the first electrical signal;
   providing a second detector configured to generate the second electrical signal; and
   adjusting a position of the light output relative to at least one of the first and second detectors based on the difference between the first and second electrical signals indicating the shot noise is above the shot noise level.

16. The method of claim 15 wherein the quantum noise is vacuum noise.

17. The method of claim 15 wherein the quantum noise is generated from the LED as part of the light output.

18. The method of claim 14 comprising extracting the one or more random bits of data based on the shot noise present in the difference signal and indicative of the quantum noise of the output.

19. A quantum random number generator (QRNG) comprising:
   a quantum noise generator configured to generate an output with quantum noise;
   a detector operably coupled to the quantum noise generator, the detector configured to generate an electrical signal that is indicative of the quantum noise in the output, the detector configured to determine if noise in the electrical signal is above a threshold level of shot noise; and
   an output controller configured to adjust a distribution of the output on the detector in response to determining noise in the electrical signal is above the threshold level of shot noise.

20. The QRNG of claim 19 comprising a bias detector configured to detect bias in the electrical signal output from the detector.

21. The QRNG of claim 19 comprising a conversion circuit configured to convert said electrical signal to a plurality of digital values by sampling said electrical signal at a sampling frequency, wherein said plurality of digital values form randomness generated from said QRNG.

22. The QRNG of claim 19 wherein said detector is a first detector, and comprising a second detector configured substantially the same as said first detector, wherein said first and second detectors are coupled to said output controller, and wherein a path of said output is affected to adjust the distribution of the output on the detector.

23. The QRNG of claim 22 wherein said first and second detectors form a homodyne detector.

* * * * *